United States Patent
Petterson

(10) Patent No.: US 9,545,077 B2
(45) Date of Patent: Jan. 17, 2017

(54) MILKING SYSTEM AND A METHOD FOR PREVENTING DETACHMENT OF A TEAT CUP FROM A TEAT DURING A MILKING PROCESS

(71) Applicant: DELAVAL HOLDING AB, Tumba (SE)

(72) Inventor: Torbjorn Petterson, Gnesta (SE)

(73) Assignee: DELAVAL HOLDING AB, Tumba (SE)

(*) Notice: Subject to any disclaimer, the term of this patent is extended or adjusted under 35 U.S.C. 154(b) by 203 days.

(21) Appl. No.: 14/364,686

(22) PCT Filed: Dec. 14, 2012

(86) PCT No.: PCT/SE2012/051398
§ 371 (c)(1),
(2) Date: Jun. 12, 2014

(87) PCT Pub. No.: WO2013/089632
PCT Pub. Date: Jun. 20, 2013

(65) Prior Publication Data
US 2014/0373787 A1 Dec. 25, 2014

Related U.S. Application Data

(60) Provisional application No. 61/576,668, filed on Dec. 16, 2011.

(30) Foreign Application Priority Data

Dec. 16, 2011 (SE) ...................... 1151211

(51) Int. Cl.
*A01J 5/007* (2006.01)
*A01J 5/04* (2006.01)
*A01J 5/01* (2006.01)

(52) U.S. Cl.
CPC *A01J 5/007* (2013.01); *A01J 5/01* (2013.01); *A01J 5/048* (2013.01)

(58) Field of Classification Search
CPC ................ A01J 5/007; A01J 5/01; A01J 5/04; A01J 5/047; A01J 5/048
See application file for complete search history.

(56) References Cited

U.S. PATENT DOCUMENTS 3,754,532 A   8/1973 Troberg et al.
5,080,040 A   1/1992 Van Der Lely et al.
(Continued)

FOREIGN PATENT DOCUMENTS

AU    2008233366 A1 * 10/2008  .............. A01J 5/047
CN    104737922 A  *  7/2015
(Continued)

OTHER PUBLICATIONS

M. D. Rasmussen and N. P. Madsen, Effects of Milkline Vacuum, Pulsator Airline Vacuum, and Cluster Weight on Milk Yield, Teat Condition, and Udder Health, 2000, Danish Institute of Agricultural Sciences.*

(Continued)

*Primary Examiner* — Monica Williams
*Assistant Examiner* — Christopher Hutchens
(74) *Attorney, Agent, or Firm* — Young & Thompson

(57) ABSTRACT

A milking method and system for preventing detachment of a teat cup from a teat of an animal during a milking process where the milking system includes a milk line connected to the teat cup, a vacuum system that applies at least two different vacuum levels to the teat cup, a measuring device configured to measure the air flow in the milk line during the milking process, and a control unit (5) that receives information about measured air flow values and to determine if the teat cup is about to be detached from the teat by (Continued)

comparing the measured air flow values ($q_a$) with an acceptable value ($q_a$, $\Delta q_a/\Delta t$), and when the measured air flow values are not acceptable, to control the vacuum system to apply a higher vacuum level to the teat cup than the present vacuum level.

20 Claims, 2 Drawing Sheets

(56) References Cited

U.S. PATENT DOCUMENTS

| | | | |
|---|---|---|---|
| 2004/0154547 A1 | 8/2004 | Brown et al. | |
| 2005/0274326 A1* | 12/2005 | Stellnert | A01J 5/007 119/14.08 |
| 2007/0283893 A1* | 12/2007 | Schuster | A01J 5/007 119/14.02 |
| 2009/0064936 A1* | 3/2009 | Petterson | A01J 5/007 119/14.02 |

FOREIGN PATENT DOCUMENTS

| | | | | |
|---|---|---|---|---|
| EP | 0 534 565 A2 | | 3/1993 | |
| EP | 0 774 203 A1 | | 5/1997 | |
| SE | CA 2466727 A1 | * | 6/2003 | ............ A01J 5/007 |
| SE | CA 2586454 A1 | * | 6/2006 | ............ A01J 5/007 |
| SE | WO 2009085007 A1 | * | 7/2009 | ............ A01J 5/0075 |
| SE | WO 2009093966 A2 | * | 7/2009 | ............ A01J 5/007 |
| SE | WO 2011151289 A1 | * | 12/2011 | ............ A01J 5/007 |
| SU | 897179 | | 1/1982 | |
| SU | 1394494 | | 10/1996 | |
| WO | 98/11773 A1 | | 3/1998 | |
| WO | 00/18218 A1 | | 4/2000 | |
| WO | 01/17335 A1 | | 3/2001 | |
| WO | 2004/042329 A1 | | 5/2004 | |

OTHER PUBLICATIONS

International Search Report, dated May 15, 2015, in corresponding International Patent Application No. PCT/SE2012/051398.

International-Type Search Report, dated Jun. 26, 2012, from corresponding PCT application.

International Search Report, dated May 3, 2013, from corresponding PCT application.

E.J. O'Callaghan et al., "Measurement of Liner Slips, Milking Time, and Milk Yield", Journal of Dairy Science, Mar. 1, 1996, pp. 390-395, vol. 79, No. 3.

* cited by examiner

MILKING SYSTEM AND A METHOD FOR PREVENTING DETACHMENT OF A TEAT CUP FROM A TEAT DURING A MILKING PROCESS

THE BACKGROUND OF THE INVENTION AND PRIOR ART

The present invention relates to a milking system and a method for preventing detachment of a teat cup from a teat during a milking process, wherein the milking system comprises a milk line connected to the teat cup, a vacuum system able to apply at least two different vacuum levels to the teat cup and measuring device configured to measure the air flow in the milk line during the milking process.

During a milking process, vacuum is applied from a vacuum source to the teat cups in order to transport milk from the teat cups, via the milk line, to a storing device for milk. In order to transport the milk in the milk line, a small air flow needs to be created in the milk line. Usually, the teat cups or connected milk tubes comprise one or several small inlet openings or vents for ambient air ensuring such an air flow. A further object of the vacuum is to provide a suction force attaching the teat cups to the teats during a milking process. Such a connection between the teat cups and the teats is substantially air tight.

Undesired detachment of teat cups from the teats of an animal during a milking process is a problem. The teat cups may be detached for many reasons such as low vacuum in the teat cup, blocked air vents, restrictions in the short milk tubes, poor cluster alignment, worn milk tubes, uneven weight distribution in the cluster or be kicked off by the animals.

Thus, one reason for undesired teat cup detachment during a milking process is a low vacuum level in the teat cup. The vacuum level in the teat cups drops when the milk flow is high. Consequently, there is an increased risk for undesired detachment of teat cups during periods of the milking process when the milk flow is high. Some individuals in a herd of milking animals are more productive than the other. For these individuals, it is an increased risk that the teat cups fall off due to high milk flow during a part of the milking process. In order to reduce this risk, it is known to use milking systems able to apply two different vacuum levels to the teat cups, one high vacuum level and a reduced vacuum level. The high vacuum level is only used when the milk flow is very high during a milking process. It is possible to use the reduced vacuum level during the whole milking process for most cows in a herd.

SUMMARY OF THE INVENTION

The object of the present invention is to decrease the risk for undesired detachment of a teat cup during a milking process of an animal.

This object is achieved with the initially mentioned milking system which comprises a control unit configured to receive information about measured air flow values and to determine if the teat cup is about to be, detached from the teat by comparing the measured air flow values with an acceptable value and, if the measured air flow values deviate from the acceptable value, to control the vacuum system such that it applies a higher vacuum level to the teat cup than the present vacuum level. The acceptable value may define a range of a parameter or one or several specific characteristics which are to be fulfilled for determining if a teat cup is about to be detached from a teat or not in view of measured air flow values. If the acceptable value is not fulfilled, the higher vacuum level is applied for preventing detachment of the teat cup. If the vacuum level in a teat cup decreases for some reason, the suction force acting between the teat cup and the teat decreases. An air leakage into the teat cup may be the result and an increased air flow in the milk line. An increased air flow through the teat cup results in its turn in a further decreased vacuum. When the vacuum level in the teat cup has decreased to a sufficient low level, the suction force between the teat cup and the teat is so low so that the teat cup falls off from the teat. Usually, this process occurs rapidly within some seconds. Consequently, the air flow in a teat cup and in a connected milk line is a very relevant parameter indicating when a teat cup is about to be detached. According to the invention, the control unit applies a higher vacuum level to the teat cup as soon as it receives information indicating that a teat cup is about to be detached. The higher vacuum level increases the suction force between the teat cup and the teat. The air leakage is reduced and the teat cup is prevented from coming loose from the teat.

According to an embodiment of the invention, the control unit is configured to compare if a measured air flow value is higher than an acceptable value in the form of a maximum allowable air flow value and, if this is the case, to control the vacuum system such that it applies a higher vacuum level to the teat cup than the present vacuum level. If the air flow in the teat cup increases to a value above a maximum allowable value, there is a great risk that teat cup is about to be detached from the teat. By applying a higher vacuum level to the teat cup, it is possible stop the increased air flow into the teat cup and prevent that the teat cup falls off.

According to an alternative embodiment of the invention, the control unit is configured to calculate a value of the air flow increase per unit time by means of measured flow values and if this calculated value is higher than an acceptable value in the form of a maximum allowable value of the air flow increase per unit time, to control the vacuum system such that it applies a higher vacuum level to the teat cup than the present vacuum level. If the air flow in a milk line suddenly increases to a high value, it is a clear indication of an air leak and that the teat cup is about to be detached from the teat. The maximum allowable value may be a predetermined value, where the risk that teat cup is about to be detached from the teat is high. The applied higher vacuum to the teat cup may here stop the accelerating air flow into the teat cup and prevent that the teat cup falls off.

According to another preferred embodiment of the invention, the control unit is configured to continue to receive measured air flow values after a higher vacuum level has been applied to the teat cup and to determine if the teat cup is still about to be detached from the teat by means of the measured air flow values. In this case, it is possible to become aware if the applied higher vacuum to the teat cup stops air leakage into the teat cup or not. In case the air leakage into the teat cup increases further in spite of the applied higher vacuum level, a further higher vacuum level to the teat cup may be applied. In this case, more than two vacuum levels are used.

According to another preferred embodiment of the invention, the control unit is configured to determine, by means of the measured air flow values, when the teat cup no longer risks being detached from the teat. When the air flow in the milk line starts to drop or to decrease below a predetermined air flow value, the control unit may determine that the teat cup no longer is about to fall off. The control unit may be configured to control the vacuum system such that it restore the previous lower vacuum level to the teat cup when it determines that the risk is over. In this case, the milking process continues with the present applied vacuum level. Alternatively, the milking process continues with the higher vacuum level during the whole milking process.

According to another preferred embodiment of the invention, the measuring device comprises a milk meter measuring the milk flow in the milk line. Different kinds of milk meters are used in most milking system in order to control the milking process in view of the milk flow. The teat cups are, for example, detached from the teats when the milk flow drops below a predetermined minimum value during a milking process.

According to a preferred embodiment of the invention, the milk meter also includes components for measuring the air flow in the milk line. Milk meters measuring both the milk flow and the air flow are available on the market. In this case, the measuring device does not need to comprise a separate air flow meter and a separate milk meter in the milk line.

According to a preferred embodiment of the invention, the control unit is configured to determine if the teat cup is about to be detached from the teat by means of measured air flow values and measured milk flow values. A high milk flow reduces the vacuum in the teat cup and increases the risk that the teat cup falls off. In this case, it is possible to consider both the air flow and the milk flow to determine if a teat cup is about to be detached. The invention is particularly suitable to apply in milking system already using two vacuum levels in order to prevent that teat cups fall off at high milk flow. In this case, only small changes have to be performed.

The above mentioned object is also achieved by the method defined in the claims 10-18.

BRIEF DESCRIPTION OF THE DRAWINGS

The present invention is now to be explained more closely by means of preferred embodiments, which are disclosed as examples, and with reference to the attached drawings.

DETAILED DESCRIPTION OF PREFERRED EMBODIMENTS OF THE INVENTION

Figure 1:
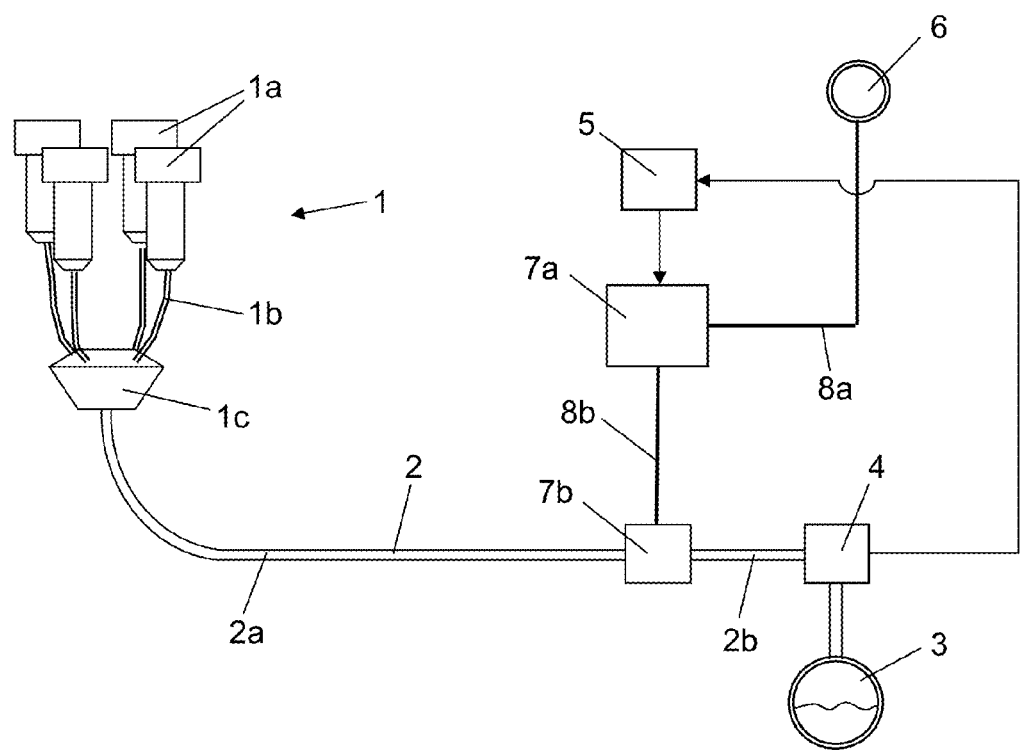
FIG. 1 shows a milking system according to an embodiment of the invention.

FIG. 1 shows a milking member 1 in the form of a cluster. The cluster comprises four teat cups $a$. The teat cups 1$a$ are connected to a claw 1$c$ by means of a respective short milk tube 1$b$. A milk line 2 is configured to transport milk from the claw 1$c$ to a main milk line 3. The main milk line 3 may receives milk from a plurality of milking members 1. The main milk line 3 is connected to a vacuum source applying a high vacuum level, which may be of about 50 kPa, to the milk line 3. The milk is transported in the main milk line 3 by means of the vacuum source to a not shown milk storage device in the form of a milk tank or the like. A milk meter 4 is arranged in the milk line 2. The milk meter 4 is configured to measure the milk flow $q_m$ in the milk line 2. The milk meter 4 is also able to measure the air flow $q_a$ in the milk line 2.

A control unit 5 is configured to receive substantially continuously information from the milk meter 4 about the milk flow $q_m$ and the air flow $q_a$ in the milk conduit 2 during a milking process. The vacuum system comprises a vacuum line 6. The vacuum level in the vacuum line is a high vacuum level, which may be of about 50 kPa. Thus, the vacuum line 6 and the main milk line 3 have the same high vacuum level. A vacuum regulating valve 7$a$ is connected to the vacuum line 6 via a first vacuum conduit 8$a$. A control valve 7$b$ is arranged in the milk line 2. The control valve 7$b$ is connected to the vacuum regulating valve 7$a$ via a second vacuum conduit 8$b$. The milk line 2 comprises a first part 2$a$ arranged upstream of the control valve 7$b$ and a second part 2$b$ arranged downstream of the control valve 7$b$ with respect to the intended milk flow direction in the milk line 2. The control valve 7$b$ has a design such it provides the same vacuum level in the first part of the 2$a$ of the milk line as in the second vacuum conduit 8$b$.

The vacuum regulating valve 7$a$ is settable in at least two different regulating positions. The vacuum regulating valve 7$a$ is settable in a high vacuum position in which it does not reduce the vacuum in the vacuum line 6 at all. Consequently, the high vacuum level in the vacuum line 6 is applied unchanged, via the first vacuum conduit 8$a$ and the vacuum regulating valve 7$a$, to the second vacuum conduit 8$b$ and to the control valve 7$b$. In this case, the control valve 7$b$ does not reduce the vacuum level in the first part 2$a$ of the milk line 2 in relation to the vacuum level in the second part 2$b$ of the milk line 2 and the main milk line 3.

The vacuum regulating valve 7$a$ is settable in at least one vacuum reducing position in relation to the high vacuum position. When the vacuum regulating valve 7$a$ is in the vacuum reducing position, a low vacuum level, which may be about 42 kPa, in the second vacuum conduit 8$b$ in relation to the high vacuum level of about 50 kPa. In this case, the control valve 7$b$ reduces the vacuum level in the first part of the milk line 2$a$ to the low vacuum level. Thereby, the vacuum level in the first part of the milk line 2$a$ is lower than the vacuum level in the second part of the milk line 2$b$. The control unit 5 is able to set the vacuum regulating valve 7$a$ in the high vacuum position and in the vacuum reducing position by means of information about measured air flow values $q_a$ and milk flow values $q_m$ from the milk meter 4 in the milk line 2.

During a milking process, vacuum is applied to the teat cups 1$a$. A first object of the vacuum in the teat cup 1$a$ is to transport the milk from the teat cup 1, via the milk line 2, to the main milk line 3. A second object of the vacuum is to provide a substantially air tight connection between the teat cups 1$a$ and the teats such that the teat cup 1$a$ obtains an attachment to a teat by means of a suction force. The vacuum level in the teat cups 1$a$ during a milking process depends on, for example, the milk flow and air flow through the teat cup 1$a$. A high milk flow decreases the vacuum level in the teat cups 1$a$. A high air flow also decreases the vacuum level in the teat cups 1$a$. If the vacuum level in a teat cup 1$a$ decreases, such as for example of an extremely high milk flow, the suction force between the teat cup 1$a$ and the teat decreases. There is here a risk that air starts to leak into the teat cup 1$a$. An air leakage increases the air flow in the milk line 2 and the vacuum level in the teat cup 1$a$ is further decreased. If the vacuum level in the teat cup 1$a$ becomes too low, the teat cup 1$a$ falls off from the teat. Usually, this process occurs rapidly within some seconds.

Figure 2:
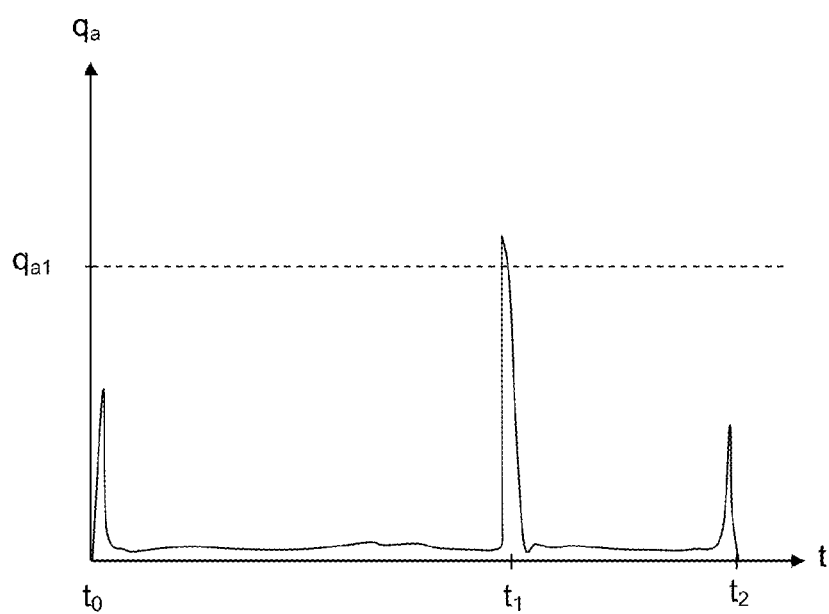
FIG. 2 shows a graph illustrating the milk flow as a function of the time during a milking process and FIG. 3 shows a block diagram of a method according to an embodiment of the invention.

FIG. 2 shows how the air flow may vary with the time during a milking process. The teat cups 1a are attached to the teats of a cow at the time $t_0$. Initially, an increased air flow $q_a$ may obtain in connection with the attachment of the teat cups 1$a$ to the teats. When the teat cups 1$a$ have been fixedly attached to the teats, a small relatively constant air flow $q_a$ is sensed by the milk meter 4 in the milk line 2 during a large part of the milking process. The teat cup 1a or the short milk tubes 1b comprises one or several inlet openings for air in order to guarantee a relatively small air flow through the milk line 2 in order to ensure the transportation of milk. However, at the time $t_1$, the air flow $q_a$ is suddenly increased. The air flow $q_a$ is here increased to a higher value than a maximum allowable air flow $q_{amax}$. The control unit 5 determines, in view of received measured air flow values $q_a$ from the milk meter 4, that one of the teat cups 1a is about to be detached from a teat. The control unit 5 sets the regulating valve 7a in the high vacuum position such that a higher vacuum level is applied to the teat cups 1a than the present vacuum level. The higher vacuum in the teat cups 1a results in an increased suction force between teat cups 1a and the teats. Usually, this measure reduces the air leakage into the teat cup 1a and the air flow $q_a$ is relatively quickly decreased to the preceding air flow level. Due to the quickly applied higher vacuum level to the teat cup 1a at the time $t_1$, the teat cup 1a was, in this case, prevented from being detached from the teat. The initially used vacuum level may be restored in the teat cups 1a as soon as the control unit 5 receives information indicating that air flow has been reduced to a normal flow level. During the following part of the milking process, a small relatively constant air flow $q_a$ is sensed by the milk meter 4. The milking process is finished at the time $t_2$ and the teat cups are removed from the teats. A temporarily increased air flow $q_a$ may occur when the teat cups 1a are removed from the teats.

Figure 3:
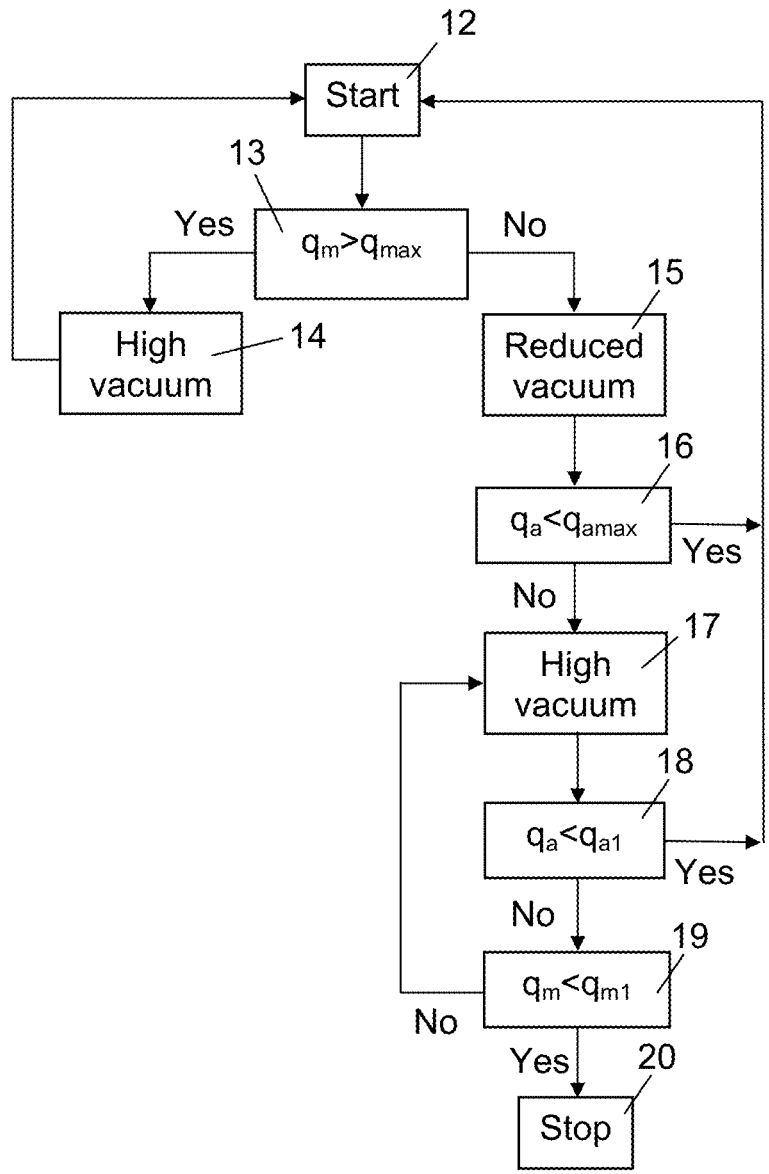

FIG. 3 shows a block diagram illustrating a process and a method which may be performed by the use of the milking system in FIG. 1. The process starts, at 12, and a milking animal in the form of a cow enters a milking stall or the like provided with a milking member 1 of the milking system. The teat cups 1a are attached to the teats of the cow manually or by means of a milking robot. The control unit 5 receives substantially continuously information from the milk meter 4 about the milk flow qm and the air flow qa in the milk line 2. At 13, the control unit 5 compares measured milk flow values qm with a maximum milk flow value $q_{max}$. If the milk flow qm is higher than a predetermined maximum milk flow value $q_{max}$, the control unit 5 determines that there is a risk that the teat cups will be detached. The control unit 5 sets the vacuum reducing valve 7a in the high vacuum position such that a high vacuum level is applied to the teat cups 1a.

The process starts again at 12 and the control unit 5 receives again information of measured milk flow values qm. At 13, the control unit 5 compares the measured milk flow values qm with the maximum milk flow value $q_{max}$. If the milk flow qm now is lower than the predetermined maximum milk flow value $q_{max}$, the control unit 5 determines that there is no risk that the teat cups will be detached from the teats. Mostly, the control unit 5 determines, at 13, that the milk flow qm is lower than the maximum allowable value $q_{max}$. The control unit 5 sets the vacuum regulating valve 7a in the vacuum reducing position, at 15, and the control valve 7b provides a reduced vacuum level to the first part of the milk line 2a.

The milking process is continued at 16. The control unit 5 compares here measured air flow values $q_a$ with a maximum allowable air flow $q_{amax}$. A too high air flow $q_a$ in the milk line 2 indicates air leakage into a teat cup 1a and that one of the teat cups 1a has started to detach from the teat. If the air flow $q_a$ is lower than the maximum allowable air flow $q_{amax}$, the control unity 5 determines that no teat cup 1 has started to detach from a teat. In this case, the process starts again, at 12. Alternatively or in combination, the control unit 5 may, at 16, calculate a value of the air flow increase per unit time $\Delta q_a/\Delta t$ and if this calculated value is higher than a maximum allowable such value $\Delta q_{amax}/\Delta t$, to control the vacuum system such that it applies a higher vacuum level to the teat cup 1a than the present vacuum level. The unit time $\Delta t$ is, for example, less than one second.

If the control unit instead determines, at 16, that air flow $q_a$ is higher than the maximum allowable air flow $q_{amax}$, at least one of the teat cups 1 seems to have started being detached from the teat. The air leakage from the surrounding to this teat cup 1a results in a sudden and rapid increase of the air flow in the milk line 2. Something has to be done in order to prevent that the teat cup 1a comes loose from the teat. The control unit 5 sets, at 17, the vacuum regulating valve 7a in the high vacuum position such that the control valve 7b applies the high vacuum level to the teat cups 1a. The suction force between the teat cups 1a and the teats increases. The air leakage between the teat cup 1a and the teat is reduced. The control unit 5 compares again, at 18, measured air flow $q_a$ values with the maximum allowable air flow $q_{amax}$. If the measured air flow $q_a$ now is lower than the maximum allowable air flow $q_{amax}$, the control unit 5 determines that the teat cups 1 will not come loose from the teat. The process starts again at 12.

If the air flow $q_a$ is still higher than the maximum allowable air flow $q_{amax}$, the applied high vacuum has not reduced the air flow $q_a$ to a lower value than the maximum allowable air flow value $q_{amax}$. The control unit 5 compares, at 19, measured milk flow $q_m$ values with a minimum allowable milk flow $q_{m1}$. A too low milk flow indicates that at least one of the teat cups 1a have been detached from a teat. If the milk flow $q_m$ is higher than the minimum allowable milk flow $q_{m1}$, the control unit 5 determines that the milk line 2 still receives milk from all teat cups 1a. Thus, none of the teat cups 1 have fallen off yet. The process continues, at 17, with an unchanged high vacuum. If instead the milk flow $q_m$ is lower than the minimum allowable air flow $q_{a1}$, the control unit 5 determines that one of the teat cups has been detached from a teat. In this case, it is possible to stop the milking process at 20.

The invention is not restricted to the described embodiments of the invention but may be varied freely within the scope of the claims. In the above mentioned embodiments, a milk line receives milk from four teat cups. It is of course possible to use one milk line for each teat cup and measure the air flow and the milk flow from each teat cup separately by means of a separate milk meter 4.

The invention claimed is:

1. A method for preventing detachment of a teat cup from a teat of an animal during a milking process performed by a milking system, wherein the milking system comprises a milk line (1b, 1c, 2) connected to the teat cup (1a) and to a milk meter (4) that measures air flow in the milk flow within the milk meter, a vacuum system that applies at least two different vacuum levels to the teat cup (1a), and a control unit (5) operatively connected to the milk meter and the vacuum system, the method comprising the steps of:

while milking the animal during the milking process, the milk meter (4) making plural air flow measurements ($q_a$) by measuring the air flow in the milk flow flowing through the milk meter;

the control unit receiving the air flow measurements ($q_a$) and comparing each of the air flow measurements ($q_a$) to an acceptable maximum air flow value($q_a$, $\Delta q_{amax}/\Delta t$); and when the comparing step finds that a current air flow measurement ($q_a$) being greater than the acceptable maximum air flow value ($q_a$, $\Delta q_{amax}/\Delta t$) indicates air leakage into the teat cup and that the teat cup has started to detach from the teat, the control unit controling the vacuum system to increase the vacuum at the teat cup from i) a present vacuum level to ii) a higher vacuum level.

2. The method of claim 1, comprising the further steps of:

after attaching the teat cup to the teat and during an initial phase of the milking the animal, the milk meter (4) making initial phase milk flow measurements ($q_m$) by measuring the milk flow through the milk meter;

the control unit receiving the initial phase milk flow measurements ($q_m$) and comparing each of the initial phase milk flow measurements ($q_m$) to an acceptable maximum milk flow value ($q_m$, $\Delta q_{max}/\Delta t$); and when the control unit finds that a current initial phase milk flow measurement ($q_m$) being more than the acceptable maximum milk flow value ($q_m$, $\Delta q_{max}/\Delta t$) indicates a risk that the teat cup will detach from the teat, the control unit controling the vacuum system to increase the vacuum at the teat cup from i) a present initial vacuum level to ii) the higher vacuum level.

3. The method of the claim 2, wherein when the comparing step finds that the current initial phase milk flow measurement ($q_m$) being less than the acceptable maximum milk flow value ($q_m$, $\Delta q_{max}/\Delta t$), which indicates that there is no risk of the teat cup detaching from the teat, the control unit controlling the vacuum system to decrease the vacuum at the teat cup from i) the present vacuum level to ii) a reduced vacuum level.

4. The method of the claim 3, comprising the further steps of:

after the comparing step finds the current air flow measurement ($q_a$) being greater than the acceptable air flow value ($q_a$, $\Delta q_{a1}/\Delta t$) and the control unit has increased the vacuum at the teat cup to the higher vacuum level, the milk meter (4) making milk flow measurements ($q_m$) by measuring the milk flow through the milk meter while the high vacuum level is applied at the teat cup;

the control unit receiving the milk flow measurements ($q_m$) and comparing each of the milk flow measurements ($q_m$) to an minimum acceptable milk flow value ($q_m$, $\Delta q_{m1}/\Delta t$);

when the comparing step finds that a current phase milk flow measurement ($q_m$) being more than the acceptable minimum milk flow value ($q_m$, $\Delta q_{m1}/\Delta t$)indicates continued milk flow from the teat, the control unit maintaining the higher vacuum level at the teat cup; and when the comparing step finds that a current phase milk flow measurement ($q_m$) being less than the minimum acceptable milk flow value ($q_m$, $\Delta q_{m1}/\Delta t$) indicates that the teat cup has detached from the teat, the control unit controlling the milking system to stop the milking process.

5. The method according to claim 2, wherein the control unit substantially continuously receives the milk flow measurements and the air flow measurements from the milk meter during the milking process.

6. The method of the claim 1, comprising the further steps of:

after the comparing step finds the current air flow measurement ($q_a$) being greater than the acceptable maximum air flow value ($q_a$, $\Delta q_{amax}/\Delta t$) and the control unit has increased the vacuum at the teat cup to the higher vacuum level, the milk meter (4) making milk flow measurements ($q_m$) by measuring the milk flow through the milk meter while the high vacuum level is applied at the teat cup;

the control unit receiving the milk flow measurements ($q_m$) and comparing each of the milk flow measurements ($q_m$) to an minimum acceptable milk flow value ($q_m$, $\Delta q_{m1}/\Delta t$);

when the comparing step finds that a current phase milk flow measurement ($q_m$) being more than the acceptable minimum milk flow value ($q_m$, $\Delta q_{m1}/\Delta t$) indicates continued milk flow from the teat, the control unit maintaining the higher vacuum level at the teat cup; and when the comparing step finds that a current phase milk flow measurement ($q_m$) being less than the minimum acceptable milk flow value ($q_m$, $\Delta q_{m1}/\Delta t$) indicates that the teat cup has detached from the teat, the control unit controlling the milking system to stop the milking process.

7. The method according to claim 6, wherein when said comparing step finds that the current phase milk flow measurement ($q_m$) is more than the acceptable minimum milk flow value ($q_m$, $\Delta q_{m1}/\Delta t$), the control unit continues to maintain the higher vacuum level at the teat cup and repeats said comparing step of finding the current air flow measurement ($q_a$) being greater than the acceptable maximum air flow value ($q_a$, $\Delta q_{amax}/\Delta t$) and the control unit controlling the vacuum system to maintain the vacuum at the teat cup to the higher vacuum level.

8. The method according to claim 1, wherein the step of comparing each of the air flow measurements ($q_a$) to the acceptable maximum air flow value ($q_a$, $\Delta q_{amax}/\Delta t$), includes i) calculating a value of present air flow increase per unit time ($\Delta q_a/\Delta t$) by using the plural air flow measurements, and ii) comparing the calculated present value of air flow increase per unit time to the acceptable maximum air flow value expressed as a maximum allowable value of air flow increase per unit time ($\Delta q$, $q_{amax}/\Delta t$) to determine that the teat cup (1a) is about to be detached from the teat (1a) and have the control unit control the vacuum system to increase the vacuum at the teat cup from i) the present vacuum level to ii) the higher vacuum level.

9. The method according to claim 8, wherein the maximum air flow increase per unit time ($\Delta q_{amax}/\Delta t$) is calculated for a time less than one second.

10. The method according to claim 1, wherein, said step of the milk meter (4) making plural air flow measurements ($q_a$) by measuring the air flow in the milk flow flowing through the milk meter, comprises the further step of the milk meter (4) making plural milk flow measurements ($q_m$) by measuring the milk flow through the milk meter, said step of the control unit receiving the air flow measurements ($q_a$) and comparing each of the air flow measurements ($q_a$) to the acceptable maximum air flow value ($q_a$, $\Delta q_{amax}/\Delta t$), comprises the further step of the control unit receiving the phase milk flow measurements ($q_m$) and comparing each of the phase milk flow measurements ($q_m$) to an acceptable maximum milk flow value ($q_m$, $\Delta q_{max}/\Delta t$), and the comparing step determines when the teat cup is about to be detached from the teat based on both i) whether the current air flow measurement ($q_a$) is greater than the acceptable maximum air flow value ($q_a$, $\Delta q_{amax}/\Delta t$), and ii) whether a current phase milk flow measurement ($q_m$) is more than the acceptable minimum milk flow value ($q_m$, $\Delta q_{m1}/\Delta t$).

11. The method according to claim 1, wherein,
said step of the milk meter (4) making plural air flow measurements ($q_a$) by measuring the air flow in the milk flow flowing through the milk meter, further comprises the milk meter (4) making plural milk flow measurements ($q_m$) by measuring the milk flow through the milk meter,
said step of the control unit receiving the air flow measurements ($q_a$) and comparing each of the air flow measurements ($q_a$) to the acceptable maximum air flow value ($q_a$, $\Delta q_{amax}/\Delta t$), further comprises the control unit receiving the phase milk flow measurements ($q_m$) and comparing each of the phase milk flow measurements ($q_m$) to an acceptable maximum milk flow value ($q_m$, $\Delta q_{max}/\Delta t$), and
the comparing step determines when the teat cup is about to be detached from the teat based on both i) the air flow measurements ($q_a$) and ii) the phase milk flow measurements ($q_m$).

12. A milking system for preventing detachment of a teat cup from a teat of an animal during a milking process, the milking system comprising:
a milk meter (4) that measures air flow in milk flow within the milk meter during milking the animal during the milking process;
a milk line (1b, 1c, 2) connected to the teat cup (1a) and to the milk meter (4);
a vacuum system that applies at least two different vacuum levels to the teat cup (1a);
and a control unit (5) operatively connected to the milk meter and the vacuum system, wherein,
while milking the animal during the milking process, the milk meter (4) makes plural air flow measurements ($q_a$) by measuring the air flow in the milk flow flowing through the milk meter,
when the control unit receives the air flow measurements ($q_a$) and compares each of the air flow measurements ($q_a$) to an acceptable maximum air flow value ($q_a$, $\Delta q_{amax}/\Delta t$); and when the control unit finds that a current air flow measurement (qa) being greater than the acceptable maximum air flow value ($q_a$, $\Delta q_{amax}/\Delta t$), which indicates air leakage into the teat cup and that the teat cup has started to detach from the teat, the control unit controls the vacuum system to increase the vacuum at the teat cup from i) a present vacuum level to ii) a higher vacuum level.

13. The milking system of claim 12, wherein,
during an initial phase of the milking process, the milk meter (4) makes initial phase milk flow measurements ($q_m$) by measuring the milk flow through the milk meter,
the control unit receives the initial phase milk flow measurements ($q_m$) and comparing each of the initial phase milk flow measurements ($q_m$) to an acceptable maximum milk flow value ($q_m$, $\Delta/\Delta t$), and
when the control unit finds that a current initial phase milk flow measurement ($q_m$) being more than the acceptable maximum milk flow value flow value ($q_m$, $\Delta q_{max}/\Delta t$) indicates a risk that the teat cup will detach from the teat, the control unit controls the vacuum system to increase the vacuum at the teat cup from i) a present initial vacuum level to ii) the higher vacuum level.

14. The milking system of claim 13, wherein when the control unit finds that the current initial phase milk flow measurement ($q_m$) being less than the acceptable maximum milk flow value ($q_m$, $\Delta q_{max}/\Delta t$) indicates that there is no risk of the teat cup detaching from the teat, the control unit controls the vacuum system to decrease the vacuum at the teat cup from i) the present vacuum level to ii) a reduced vacuum level.

15. The milking system of claim 14, wherein,
after the control_unit finds the current air flow measurement ($q_a$) being greater than the acceptable air flow value ($q_a$, $\Delta q_{a1}/\Delta t$) and the control unit controls the vacuum system to increase the vacuum at the teat cup to the higher vacuum level at the teat cup, the milk meter (4) making milk flow measurements ($q_m$) by measuring the milk flow through the milk meter while the high vacuum level is applied at the teat cup,
the control unit receives the milk flow measurements ($q_m$) and compares each of the milk flow measurements ($q_m$) to an minimum acceptable milk flow value ($q_m$, $\Delta q_{m1}/\Delta t$),
when the control unit finds that a current phase milk flow measurement ($q_m$) being more than the acceptable minimum milk flow value ($q_m$, $\Delta q_{m1}/\Delta t$) indicates continued milk flow from the teat, the control unit maintains the higher vacuum level at the teat cup; and
when the control unit finds that a current phase milk flow measurement ($q_m$) being less than the minimum acceptable milk flow value ($q_m$, $\Delta q_{m1}/\Delta t$) indicates that the teat cup has detached from the teat, the control unit controls the milking system to stop the milking process.

16. The milking system of claim 12, wherein,
after the control unit finds the current air flow measurement ($q_a$) being greater than the acceptable maximum air flow value ($q_a$, $\Delta q_{amax}/\Delta t$) and the control unit controls the vacuum system to increase the vacuum at the teat cup to the higher vacuum level at the teat cup, the milk meter (4) makes milk flow measurements ($q_m$) by measuring the milk flow through the milk meter while the high vacuum level is applied at the teat cup,
the control unit receives the milk flow measurements ($q_m$) and compares each of the milk flow measurements ($q_m$) to an minimum acceptable milk flow value ($q_m$, $\Delta q_{m1}/\Delta t$),
when the control unit finds that a current phase milk flow measurement ($q_m$) being more than the acceptable minimum milk flow value ($q_m$, $\Delta q_{m1}/\Delta t$) indicates continued milk flow from the teat, the control unit maintains the higher vacuum level at the teat cup; and
when the control unit finds that a current phase milk flow measurement ($q_m$) being less than the minimum acceptable milk flow value ($q_m$, $\Delta q_{m1}/\Delta t$) indicates that the teat cup has detached from the teat, the control unit controls the milking system to stop the milking process.

17. The milking system of claim 12, wherein when the control unit compares each of the air flow measurements ($q_a$) to the acceptable maximum air flow value ($q_a$, $\Delta q_{amax}/\Delta t$), the control unit further i) calculates a value of present air flow increase per unit time ($\Delta q_a/\Delta t$) by using the plural air flow measurement, and ii) compares the calculated present value of air flow increase per unit time to the acceptable maximum air flow value expressed as a maximum allowable value of air flow increase per unit time ($\Delta q_{amax}/\Delta t$) to determine that the teat cup (1a) is about to be detached from the teat (1a) and have the control unit control the vacuum system to increase the vacuum at the teat cup from i) the present vacuum level to ii) the higher vacuum level.

18. The milking system of claim 12, wherein when said control unit finds that the current phase milk flow measurement ($q_m$) is more than the acceptable minimum milk flow value ($q_m$, $\Delta q_{m1}/\Delta t$), the control unit continues to maintain the higher vacuum level at the teat cup and when the control unit repeatedly finds the current air flow measurement ($q_a$) being greater than the acceptable maximum air flow value ($q_a$, $\Delta q_{amax}/\Delta t$), the control unit controls the vacuum system to maintain the vacuum at the teat cup to the higher vacuum level.

19. The milking system of claim 12, wherein, said milk meter (4) makes plural milk flow measurements ($q_m$) by measuring the milk flow through the milk meter, said control unit receives the phase milk flow measurements ($q_m$) and compares each of the phase milk flow measurements ($q_m$) to an acceptable maximum milk flow value ($q_m$, $\Delta q_{max}/\Delta t$), and the control unit determines when the teat cup is about to be detached from the teat based on both i) whether the current air flow measurement ($q_a$) is greater than the acceptable maximum air flow value ($q_a$, $\Delta q_{amax}/\Delta t$), and ii) whether a current phase milk flow measurement ($q_m$) being more than the acceptable minimum milk flow value ($q_m$, $\Delta q_{m1}/\Delta t$).

20. The milking system of claim 12, wherein, said milk meter (4) makes plural milk flow measurements ($q_m$) by measuring the milk flow through the milk meter, said control unit receives the phase milk flow measurements ($q_m$) and compares each of the phase milk flow measurements ($q_m$) to an acceptable maximum milk flow value ($q_m$, $\Delta q_{max}/\Delta t$); and the control unit determines when the teat cup is about to be detached from the teat based on both i) the air flow measurements ($q_a$) and ii) the phase milk flow measurements ($q_m$).

* * * * *